(12) United States Patent
Graf et al.

(10) Patent No.: US 12,104,935 B2
(45) Date of Patent: Oct. 1, 2024

(54) MAGNETIC-INDUCTIVE FLOW METER

(71) Applicant: Endress+Hauser Flowtec AG, Reinach (CH)

(72) Inventors: Oliver Graf, Känerkinden (CH); Raphael Hess, Reinach (CH); Simon Triebenbacher, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 335 days.

(21) Appl. No.: 17/753,375

(22) PCT Filed: Aug. 20, 2020

(86) PCT No.: PCT/EP2020/073368
§ 371 (c)(1),
(2) Date: Mar. 1, 2022

(87) PCT Pub. No.: WO2021/043586
PCT Pub. Date: Mar. 11, 2021

(65) Prior Publication Data
US 2022/0299347 A1    Sep. 22, 2022

(30) Foreign Application Priority Data

Sep. 2, 2019  (DE) .......................... 102019123413.1

(51) Int. Cl.
*G01F 1/58* (2006.01)
*G01F 1/60* (2006.01)

(52) U.S. Cl.
CPC .............. *G01F 1/588* (2013.01); *G01F 1/584* (2013.01); *G01F 1/60* (2013.01)

(58) Field of Classification Search
CPC ............. G01F 1/588; G01F 1/584; G01F 1/60
See application file for complete search history.

(56) References Cited

U.S. PATENT DOCUMENTS

| 5,263,374 | A | 11/1993 | Marsh | |
|---|---|---|---|---|
| 2007/0137311 | A1* | 6/2007 | Poortmann | ............. G01F 1/586 73/861.08 |

(Continued)

FOREIGN PATENT DOCUMENTS

| CN | 200979426 Y | 11/2007 |
|---|---|---|
| CN | 101194147 A | 6/2008 |

(Continued)

*Primary Examiner* — Peter J Macchiarolo
*Assistant Examiner* — John M Royston
(74) *Attorney, Agent, or Firm* — Christopher R. Powers; Endress+Hauser (USA) Holding, Inc.

(57) ABSTRACT

A magnetic-inductive flow meter includes: a measuring tube for guiding a flowable medium in a longitudinal direction; a measuring electrode arrangement for detecting a measurement voltage dependent on the flow velocity, induced in the medium, two measuring electrode groups opposite one another on the measuring tube; and a magnetic field generating device for generating a magnetic field which passes through the measuring tube and including at least two coil core groups, each having at least two coil cores, wherein a first and a second part of the measuring tube each include at least one coil core group, wherein two radii, which intersect the coil cores of a coil core group that lie externally in a cross-sectional plane of the measuring tube, enclose a centre angle $\beta$ by which $80° \leq \beta \leq 105°$.

25 Claims, 2 Drawing Sheets

(56) References Cited

U.S. PATENT DOCUMENTS

| | | |
|---|---|---|
| 2014/0083199 A1 | 3/2014 | Rogers |
| 2016/0341582 A1 | 11/2016 | Lim et al. |
| 2017/0322060 A1 | 11/2017 | Sakata |
| 2019/0133478 A1* | 5/2019 | Varcoe .................. A61B 5/245 |
| 2019/0383652 A1* | 12/2019 | Küng ....................... G01F 1/60 |
| 2020/0271491 A1* | 8/2020 | Tschudin ............... G01F 1/586 |

FOREIGN PATENT DOCUMENTS

| | | | |
|---|---|---|---|
| CN | 101294832 A | 10/2008 | |
| CN | 102803906 A | 11/2012 | |
| CN | 103827639 A | 5/2014 | |
| CN | 105784023 A | 7/2016 | |
| CN | 206523186 U | 9/2017 | |
| DE | 1911556 A1 | 9/1970 | |
| DE | 102014113408 A1 | 3/2016 | |
| DE | 102014113409 A1 | 3/2016 | |
| DE | 102015113390 A1 | 3/2017 | |
| DE | 102015120730 A1 * | 6/2017 | |
| EP | 08787694 A1 | 11/1998 | |
| GB | 990484 A | 4/1965 | |
| JP | S5866017 A | 4/1983 | |
| JP | 5126865 A | 5/1993 | |
| JP | 2001281028 A | 10/2001 | |
| WO | 2004031699 A2 | 4/2004 | |
| WO | WO-2018114189 A1 * | 6/2018 | ............... G01F 1/58 |

* cited by examiner

MAGNETIC-INDUCTIVE FLOW METER

CROSS-REFERENCE TO RELATED APPLICATIONS

The present application is related to and claims the priority benefit of German Patent Application No. 10 2019 123 413.1, filed on Sep. 2, 2019, and International Patent Application No. PCT/EP2020/073368, filed Aug. 20, 2020, the entire contents of which are incorporated herein by reference.

TECHNICAL FIELD

The present disclosure relates to magnetic-inductive flow meters, in particular, magnetic-inductive flow meters having an arrangement of coil cores relative to an arrangement of measuring electrodes.

BACKGROUND

Magnetic-inductive flow meters are used for determining the flow rate and the volumetric flow of a flowing medium in a pipeline. A magnetic-inductive flow meter has a magnet system that generates a magnetic field perpendicular to the direction of flow of the flowing medium. Single coils are typically used for this purpose. In order to realize a predominantly homogeneous magnetic field, pole shoes are additionally formed and attached such that the magnetic field lines run over the entire pipe cross-section substantially perpendicularly to the transverse axis or in parallel to the vertical axis of the measuring pipe. A measuring electrode pair attached to the lateral surface of the measuring pipe taps an electrical measurement voltage or potential difference which is applied perpendicularly to the direction of flow and to the magnetic field and occurs when a conductive medium flows in the direction of flow when the magnetic field is applied. Since, according to Faraday's law of induction, the tapped measurement voltage depends upon the velocity of the flowing medium, the flow rate u and, with the aid of a known pipe cross-section, the volumetric flow $\dot{V}$ can be determined from the induced measurement voltage U.

Magnetic-inductive flow meters frequently are used in process and automation technology for fluids starting at an electrical conductivity of approximately 5 µS/cm. Corresponding flow meters are sold by the applicant in a wide variety of embodiments for various fields of application—for example, under the name, PROMAG.

From DE 102014113409 A1, a magnetic-inductive flow meter is known which has field returns and pole shoes that are fastened so as to abut the outer wall of the measuring tube and are connected to one another via cylindrical coil cores. This arrangement is especially suitable for magnetic-inductive flow meters having large nominal diameters. Field returns serve to guide the magnetic field lines from a first coil core to a second coil core. However, a disadvantage of this magnetic-inductive flow meter is that the flow measurement value is sensitive to the flow profile of the medium.

Conventional magnetic-inductive flow meters are sensitive to the flow profile of the medium. Depending upon the tube system and meter, measurement errors of several percent can occur. A straight tube, the length of which corresponds to at least five to ten times the nominal diameter of the measuring tube, is therefore usually installed on the inlet-side front face. However, applications are known in which this minimum distance—the so-called inlet section—cannot be maintained. This is the case, for example, when a tube system is located in the narrowest space. The invention disclosed in DE 102014113408 A1 provides a solution in which a constriction of the tube diameter leads to the conditioning of the flow, whereby the influence of the flow profile is minimized, so that a 0-DN inlet section can be used. However, this embodiment is disadvantageous in that, while a lower sensitivity to rotationally-asymmetrical flow profiles can be realized, a pressure loss must be tolerated as a result. In addition, this embodiment is limited to tube systems with DN<350.

The sensitivity of the flow measurement with respect to a rotationally-asymmetrical flow profile depends upon the geometry of the measuring tube and the electrodes. Therefore, the influences of the tube and electrode geometry must be taken into account for the correct description of the speed-dependent induction voltage. The two aforementioned influences are mathematically represented by a weight function GF. The influence of the geometry on the flow can be best illustrated in the following relationship:

$$U(x) = \int_V v(x') GF(x', x) dV$$

wherein, for determining the voltage U(x), the flow velocity v(x') and the weight function GF(x', x) are integrated over the volume of the measuring tube. The weight function GF is described using GF(x', x)=B×∇G(x', x), with the magnetic field B(x') and a Green function G, which is given by the electrical boundary conditions. The aim of an optimization method is to optimize the geometry of the structure in such a way that ∇×GF=0 applies in the entire flow profile. However, this is not possible for a tube having a single, punctiform measuring electrode pair. One possible approach provides for the adaptation of the electrode shape. However, this is not practical and causes new difficulties. Another approach is to use multiple pairs of measuring electrodes.

For example, CN 101294832 A discloses a magnetic-inductive flow meter which has two measuring electrode pairs that are arranged axially symmetrically in a tube cross-section in order to thus minimize the influence of the flow profile on the determination of the volumetric flow. The two electrode axes defined by the respective pairs of measuring electrodes span an angle of approximately 40° in the cross-section of the measuring tube.

A further embodiment is shown in DE 102015113390 A1, in which a second and third measuring electrode pair are arranged on defined electrode axes, which are arranged at an angle of less than or equal to ±45° relative to a first electrode axis oriented perpendicularly to the magnetic field.

SUMMARY

EP 0878694 A1 also discloses a magnetic-inductive flow meter which, starting from the prior art, brings an improvement in the measurement accuracy in the range of measurement errors below 1% by using two, additional measuring electrode pairs the electrode axes of which each span an angle of approximately 45°, relative to the electrode axis of the conventional measuring electrode pair, to the measuring tube axis. This is achieved especially by the potential differences applied to the electrodes being individually detected and weighted.

However, these embodiments are disadvantageous in that, although the measurement accuracy is optimized for small diameters, it does not achieve the desired reduction in the measurement errors for commercially available measuring tubes having a large nominal width. It is also disadvantageous that a weighting factor must be taken into account for each measuring electrode pair, wherein it is not clear from the outset how this, as a function of the tube system or the rotationally-asymmetrical flow profile, must be selected.

Starting from the described prior art, the aim of the present invention is to provide a magnetic-inductive flow meter which minimizes the influences of a rotationally-asymmetrical flow profile during the determination of the flow measurement value.

The aim is achieved by the magnetic-inductive flow meter according to the present disclosure.

The magnetic-inductive flow meter according to the invention comprises:
 a measuring tube for guiding a flowable medium in a longitudinal direction;
 a measuring electrode arrangement for detecting a measurement voltage, which is dependent upon the flow velocity and is induced in the medium,
 wherein the measuring electrode arrangement has two measuring electrode groups, which are fastened opposite one another on the measuring tube; and
 a magnetic-field-generating device for generating a magnetic field that passes through the measuring tube,
 wherein the magnetic-field-generating device has at least two coil core groups, each having at least two coil cores,
 wherein a reference plane, which is spanned by a longitudinal axis of the measuring tube and a transverse axis, which intersects measuring electrodes of the measuring electrode arrangement, of the measuring tube, divides the measuring tube into a first and a second part,
 wherein the first and second parts of the measuring tube each have at least one coil core group,
 characterized in that
 two radii, which intersect the coil cores of a coil core group which lie externally in a cross-sectional plane of the measuring tube, span a center angle $\beta$,
 wherein, for the center angle $\beta$, it is the case that $30° \leq \beta \leq 120°$, especially $60° \leq \beta \leq 110°$, and preferably $80° \leq \beta \leq 105°$, if the measuring electrode groups each comprise precisely one measuring electrode and that $30° \leq \beta \leq 120°$, especially $45° \leq \beta \leq 100°$, and preferably $60° \leq \beta \leq 80°$, if the measuring electrode groups each comprise at least two measuring electrodes.

Advantageously, at least two coil cores are each arranged with at least one coil in the respective parts of the measuring tube. According to this embodiment, a further optimization possibility results therefrom for the resulting magnetic field in the measuring tube.

Optimization possibilities provide the position of the respective coil cores, the number of coils, the diameter of the coil core, the number of windings, and the cross-section of the windings.

In order to create a flow-profile-independent magnetic-inductive flow meter, the arrangement of the coil cores must be adapted to the number of measuring electrodes. The preferred center angles of both cases are mutually exclusive.

In a further preferred embodiment, the measuring tube is made of a metal which is lined with an electrically-insulating liner in the fluid-contacting region. Alternatively, the measuring tube can also be made of a ceramic or a plastic, wherein the at least two pole shoes and/or the at least two return plates are arranged on the outer lateral surface of the measuring tube, or embedded in the measuring tube.

One embodiment provides that two radii, each of which intersects a measuring electrode, which lies externally in a cross-sectional plane of the measuring tube, of a measuring electrode group, span a center angle $\alpha$, wherein $10° \leq \alpha \leq 60°$, especially $15° \leq \alpha \leq 50°$, and preferably $20° \leq \alpha \leq 40°$, is fulfilled.

Advantageously, the measuring tube comprises at least two measuring electrodes instead of large-area measuring electrodes, in order to measure the potential distribution present in the medium at several positions or to obtain an averaging of the potential distribution in the medium over a larger range. The claimed arrangement has proven to be especially advantageous, because the measuring voltage applied to the measuring electrodes is especially insensitive to asymmetries in the flow profile.

However, this arrangement correlates with the arrangement of the coil cores. Only by the combination of the two features is the insensitivity to asymmetries in the flow profile produced.

The radii which run through the externally-situated measuring electrodes span a circular section in which all measuring electrodes of a measuring electrode group are arranged.

One embodiment provides that a coil core group have at least four, and preferably precisely four, coil cores, which are attached in a cross-sectional plane of the measuring tube,
 wherein the radii that each intersect the internally-situated coil cores of a coil core group span a center angle $\gamma$ for which it is the case that $1° \leq \gamma \leq 80°$, especially $2° \leq \gamma \leq 50°$, and preferably $10° \leq \gamma \leq 40°$.

It is especially advantageous if the coil core groups have, in addition to the externally-situated, two coil cores, at least two further coil cores which are arranged between the two, externally-situated coil cores. The magnetic flux density in the measuring tube can thus be increased. In addition, this results in a further optimization possibility for controlling the magnetic field in the interior of the measuring tube.

As an advantageous embodiment, the above-claimed arrangement of the internally-situated coil cores of a coil core group in combination with the arrangement claimed for the measuring electrodes and the externally-situated coil cores has been found to achieve, in addition to the increasing compactness of the components attached to the outer wall of the measuring tube, a reduction in the sensitivity to asymmetries in the flow profile.

Preferably, the coil cores each have a slot through which a clamping band is guided, with which the coil cores are fixed to the measuring tube. The claimed arrangement is, furthermore, advantageous in relation to the fastening of the coil cores and the field return assembly because, especially in the case of the claimed arrangement of the inner coil cores, the clamping band during fixation presses not only the coil cores against the outer wall of the measuring tube or against parts of the pole shoe and the field return, but also the ends of the field returns. This results in a minimization of the overshoot or a better control over the overshoot behavior of the magnetic field during changes in direction.

One embodiment provides that a coil core group have at least three, and preferably precisely three, coil cores,
 wherein a coil core is cut through a transverse axis running perpendicular to the reference plane.

It is advantageous if, in addition to the two, externally-situated coil cores, at least one further coil core is arranged between the externally-situated coil cores.

Preferably, the coil core groups each have precisely three coil cores, wherein the centrally-attached coil core is spaced equally apart from the two outer coil cores.

One embodiment provides that a coil core run through at least two, and preferably precisely two, coils,
 wherein a longitudinal axis of the coil core runs parallel to the longitudinal axis of the measuring tube.

In order to increase the magnetic flux density in the measuring tube, the number of windings or the coil current must be increased. It has been found to be advantageous to increase the diameter of the windings and to arrange additional coils on the measuring tube. As a result, a compact design for the magnetic-inductive flow meter can be ensured, and magnetic-inductive flow meter having especially large nominal diameters can be realized from many identical components or identical components.

It is advantageous if each of the at least four coils has the same geometry, especially a non-saddle-shaped, planar geometry. The use of planar coils, advantageously with respect to the costs, reduces the need for copper.

Furthermore, it is advantageous if each of the at least four coils is of the same design. This simplifies the design and the assembly.

One embodiment provides that all the coils connected in series have an electrical resistance between 2 and 300Ω, especially between 100 and 280Ω, and preferably between 150 and 260Ω.

One embodiment provides that the magnetic-field-generating device have two pole shoes,
wherein the pole shoes are fastened opposite one another, especially against an outer wall of the measuring tube,
wherein the pole shoes are each formed by at least two, and preferably precisely two or precisely four, pole shoe bodies,
wherein the pole shoe bodies are formed from stacked sheets of sheet metal, especially electrical steel sheets.

As a result, a simplified mounting of the pole shoes on the outer wall of the measuring tube can be realized.

One embodiment provides that two, adjacent pole shoe bodies be spaced apart a minimum distance C in the longitudinal direction of the measuring tube which is less than 500 millimeters, especially less than 50 millimeters, and preferably between 2 and 5 millimeters.

The spacing between two pole shoe bodies forms a guide for guiding the cabling of the measuring electrodes. However, the claimed pole shoe arrangement ensures that the magnetic field lines in the measurement region run substantially perpendicular to the electrode axis and to the longitudinal axis of the measuring tube.

One embodiment provides that at least one field return assembly be attached to, especially so as to abut, the outer wall of the measuring tube,
wherein the field return assembly comprises at least two field returns,
wherein the coil cores connect the pole shoes to the field returns.

In a preferred embodiment, the field returns and pole shoes have the shape of rectangular, curved sheets of sheet metal, wherein the curvature is adapted to the measuring tube. The field return and the pole shoes are fastened so as to abut the outer wall of the measuring tube. In this case, it is advantageous if the pole shoes are designed in two parts, because, in this way, especially in the case of measuring tubes having large nominal diameters (≥DN 1,000), simple assembly is made possible. The same also applies for the field returns.

The direct arrangement of the coils, pole shoes, and field returns on the measuring tube significantly reduces the material requirement for these components. Furthermore, the fastening on the measuring tube is especially simple and, at the same time, especially stable. Despite the reduction in manufacturing costs, a high measurement accuracy can be achieved, since interfering stray fields can be minimized. A direct arrangement means that the components are arranged directly on the measuring tube. For example, they can be glued directly onto the measuring tube.

A field return assembly is usually provided for the purpose of capturing magnetic field lines, which exit from the coil core and do not intersect, or only partially intersect, the measuring tube, and guiding them from one coil core to another coil core. Therefore, the field returns usually connect the side, facing away from the pole shoe, of the coil cores or the respective ends of the coil cores, which do not touch the pole shoe, to one another.

One embodiment provides that all measuring electrodes of a measuring electrode group be electrically connected to each other, and, especially, short-circuited.

The short-circuiting can be produced by conventional cables or by means of specially-shaped contact bodies, which simplify the connection of the measuring electrodes during the manufacture of the magnetic-inductive flow meter.

The technical success of this embodiment of the invention is that it has been found that the adjustment of the angles $\alpha$ and $\beta$ obviates a sampling of the individual potential differences with the addition of empirically-determined weighting factors, and the applied voltage across all electrodes deviates, in the event of a malfunction, by less than 0.5% from a measured value determined using a fully-formed flow profile. A weighting of the individual voltage values is therefore not necessary, as a result of which the evaluation unit for determining the applied voltage and the resulting flow velocity can be significantly simplified. It is now sufficient to convert the measured voltage value into a flow velocity or a volumetric flow by means of a calibration.

The electrodes are connected to a measuring circuit which supplies information on the flow measurement value of the medium in the measuring tube on the basis of the voltage induced in the electrodes. The flow measurement value comprises the flow velocity, the volumetric flow, and the mass flow of the flowing medium.

One embodiment provides that the two parts of the measuring tube each have precisely two coil core groups,
wherein a first coil core group and a second coil core group are arranged in the first part of the measuring tube,
wherein the first coil core group is arranged in a first cross-sectional plane, and a second coil core group is arranged in a second cross-sectional plane,
wherein the first and second cross-sectional planes are spaced apart in the longitudinal direction.

A symmetrical distribution of the magnetic field in the measuring tube is thereby realized.

One embodiment provides that the measuring electrode arrangement be arranged in a third cross-sectional plane,
wherein the third cross-sectional plane is arranged between the first and second cross-sectional planes, and preferably forms a symmetry plane of the coil core groups and preferably of the magnetic-field-generating device.

This results in a symmetrical distribution of the magnetic field in the measuring tube, whereby the measuring tube can be operated in both longitudinal directions. This arrangement is especially suitable for measuring tubes having nominal diameters ≥DN1,000.

The angles $\alpha$, $\beta$, and especially $\gamma$ are coordinated with one another such that the flow meter is insensitive to deviations of a rotationally-symmetrical flow to the extent that the magnetic-inductive flow meter, during a test measurement, has a measurement error of the flow rate $$\Delta_u = \left| \frac{u_{va} - u_S}{u_{va}} \right|$$

and/or a measurement error of the volumetric flow $$\Delta_{\dot{V}} = \left| \frac{\dot{V}_{va} - \dot{V}_S}{\dot{V}_{va}} \right|$$

of less than 1.0%, especially less than 0.5%, and preferably less than 0.2%, wherein a flow rate $u_{va}$ and/or a volumetric flow $\dot{V}_{va}$ are determined in the case of a flow with a fully-formed flow profile, wherein a flow rate $u_S$ and/or a volumetric flow $\dot{V}_S$ are determined in the case of a rotationally-asymmetrical flow.

After interferences, measurement errors occur due to a non-ideal flow profile, depending upon the distance and type of interference, because a magnetic-inductive flow meter normally assumes and has been optimized to the effect that a fully-formed, rotationally-symmetrical flow profile is present. In this case, the flow profile is to be understood as a fully-formed, rotationally-symmetrical flow profile that no longer changes in flow direction. Such a flow profile is formed, for example, in a measuring tube with an inlet section corresponding to 30 times the measuring tube nominal width and a medium speed of 2 m/s.

Test measurement can also be used for tuning the optimum angles α and β and is then carried out in advance so that, taking into account the angle pair (α-β), a flow-profile-independent magnetic-inductive flow meter is realized.

The test measurement can include many different sources of interference, which can all assume any installation angle. By using sufficiently different interferences, the angles α and β can be optimized to the effect that the measurement error of a specific interference assumes a value of less than 0.05%, and the maximum measurement error of any interference assumes a value of less than 0.5%.

It has been found that by using two, sufficiently different interference sources, especially a diaphragm and a 90° tube bend, an already sufficiently good angle pair (α-β) for a magnetic-inductive flow meter is determined, which has a maximum measurement error of 0.5% for an arbitrarily different type of interference. By incorporating further interference sources into the test measurement, the optimized parameters change only marginally, as a result of which the resulting measurement error changes only slightly.

According to one embodiment, the interference source comprises a diaphragm or a 90° tube bend, wherein the diaphragm covers 10% of the cross-section of the measuring tube, wherein the diaphragm has a chord, which delimits the diaphragm towards the tube, wherein the diaphragm has a first diaphragm orientation or a second diaphragm orientation, wherein the chord is oriented to be perpendicular to the magnetic field in the case of the first diaphragm orientation, and the chord is oriented to be parallel to the magnetic field in the case of the second diaphragm orientation, wherein the 90° tube bend assumes a first tube bend orientation or second tube bend orientation, wherein the first tube bend orientation is characterized by a tube axis running perpendicular to the magnetic field and to the longitudinal direction of the measuring tube, and the second tube bend orientation is characterized by a tube axis running parallel to the magnetic field and perpendicular to the longitudinal orientation of the measuring tube.

Until now, a prescribed inlet section has been predetermined for the user of magnetic-inductive flow meters. This prescribed inlet section is necessary for maintaining the measurement error specified for the device. The measurement errors which occur must be determined once per interference type, distance, assembly angle, and, possibly, Reynolds number. This is done either by complex series of measurements or by simulations of the flow conditions when there are different interferences and evaluation of the calculated flow profiles. As a result of this step, data are obtained which indicate how large the measurement error is that would arise if a magnetic-inductive flow meter were to be installed in the corresponding position, and how large the measurement error is if the design is supplemented by further measuring electrodes, or the magnetic-field-generating device is adapted.

According to a further embodiment, the interference is configured at a distance 0-DN from the inlet-side front face.

According to a further development, there is an insensitivity to a rotationally-asymmetrical flow profile in the case of a Reynolds number of the medium in the measuring tube that is greater than or equal to 10,000, especially greater than or equal to 50,000, and preferably greater than or equal to 100,000.

According to a further embodiment, a measuring electrode group has precisely three measuring electrodes.

The measuring electrode groups do not necessarily have to be arranged diametrically. The measuring electrodes are galvanically or capacitively coupled to the measuring medium.

The invention is explained in greater detail with reference to the following figures. The following are shown:

DETAILED DESCRIPTION

Figure 1:
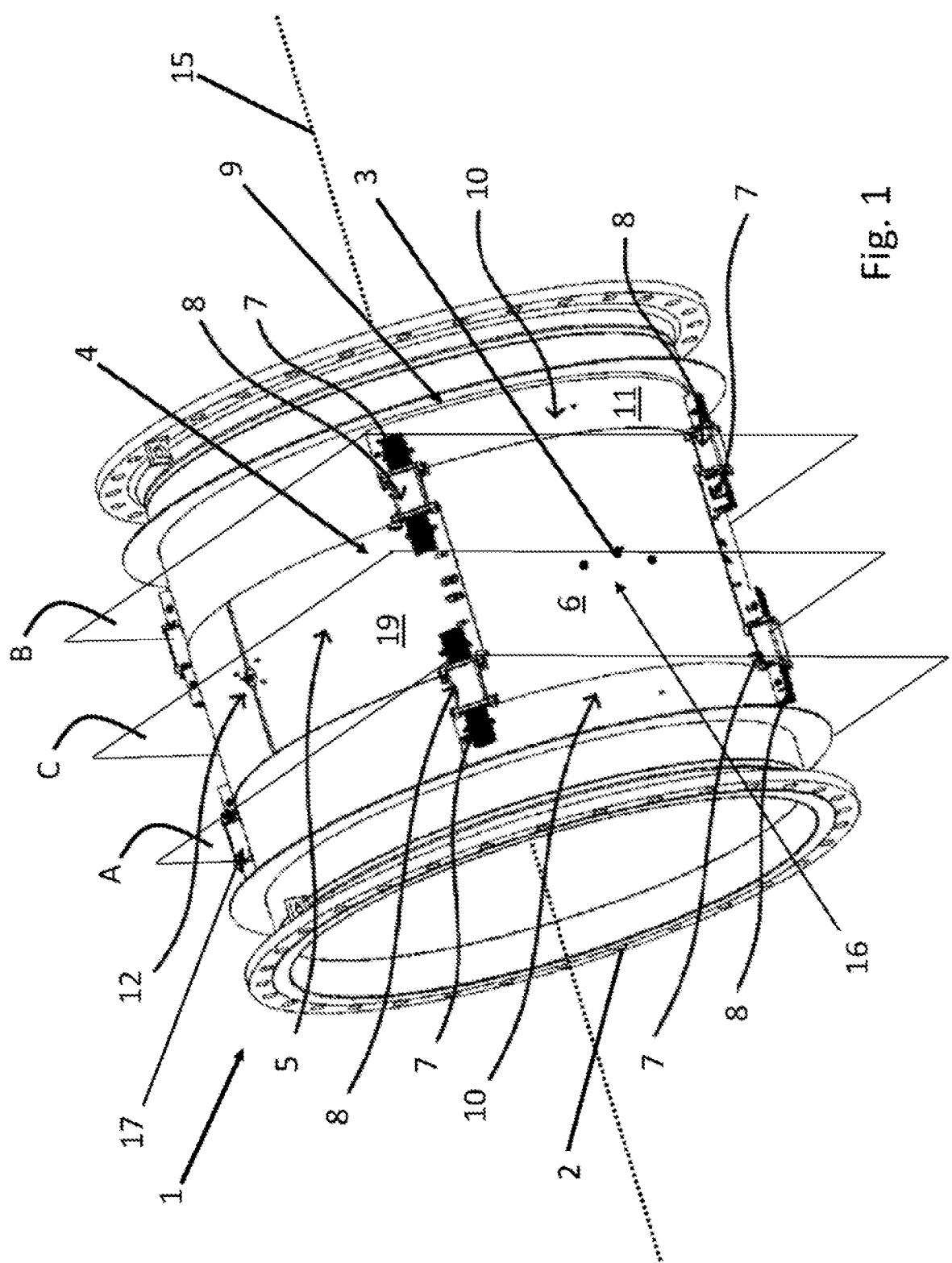
FIG. 1 shows a first embodiment of the magnetic-inductive flow meter according to the present disclosure; and FIG. shows a parallel projection of the first and third cross-sectional planes A, B through a second embodiment of the magnetic-inductive flow meter.

The structure and measuring principle of a magnetic-induction flow meter are basically known. FIG. 1 shows a first embodiment of the magnetic-inductive flow meter according to the invention. A medium having an electrical conductivity is guided through a measuring tube 1. A magnetic-field-generating device 4 is arranged on the measuring tube in such a way that the magnetic field lines are oriented to be substantially perpendicular to a longitudinal direction defined by the measuring tube axis. A saddle coil or a pole shoe 5 with an attached coil core 7 and coil 8 is preferably suitable as the magnetic-field-generating device 4. FIG. 1 shows two pole shoes 5, each of which is designed in two parts. Furthermore, the magnetic-inductive flow meter has a field return assembly 9, consisting of four field return parts 10, wherein only two field return parts 10 are depicted. These are fastened so as to abut the outer wall 6 of the measuring tube 1. FIG. 1 shows only six of eight cylindrical coil cores 7 and coils 8. The longitudinal axis of the coil cores 7 runs substantially parallel to the longitudinal axis 15 of the measuring tube. The coil cores 7 connect the pole shoe 5 to the field return bodies 10. A coil 8 is arranged between the field return bodies 10 and one of the pole shoes 5. According to the invention, however, more coils can also be arranged. Each field return part 10 comprises a field return body 11, which is formed from several punch-bundled, electrical steel sheets. The thickness of the pole shoe body 19 and the thickness of the field return part 10 are substantially the same. The pole shoe bodies 19 are preferably formed from punch-bundled, electrical steel sheets. The field return parts 10 each connect at least two different coil cores 7, whereby a magnetic coupling is realized. The individual components of the magnet system are fastened to the measuring tube body by means of screws. When the magnetic field is applied, a flow-dependent potential distribution is produced in the measuring tube 1 and is tapped with two, opposing measuring electrode groups 16 attached to the inner wall of the measuring tube 1. As a rule, these are arranged diametrically and form an electrode axis or are intersected by a transverse axis which runs perpendicular to the magnetic field lines and the longitudinal axis of the measuring tube. The measuring electrodes 3 are all in a third cross-section C. In the embodiment, a measuring electrode group 16 has precisely three measuring electrodes 3. Based upon the tapped measurement voltage U, and taking into account the magnetic flux density, the flow rate u and, with additional consideration of the tube cross-sectional area, the volumetric flow $\dot{V}$ of the medium can be determined. If the medium density is additionally known, the mass flow $\dot{m}$ can also be monitored. In order to prevent the discharge via the measuring tube 1 of the measuring voltage applied to measuring electrode groups 16, the inner wall is lined with an insulating material—for example, a plastic liner. A measuring circuit is configured to detect the measurement voltage applied to the measuring electrode groups 16. In this case, the respective measuring electrodes 3 of a measuring electrode group 16 are electrically connected to one another. An evaluation circuit is designed to determine the flow measurement values of the medium from the detected measurement voltage. The magnetic-field-generating device 4 is controlled via an operating circuit. Commercially available magnetic-inductive flow meters have two further electrodes in addition to the measuring electrodes 3. On the one hand, a fill-level monitoring electrode 12, which is, optimally, attached to the highest point in the measuring tube 1, serves to detect partial filling of the measuring tube 1 and is designed to pass this information to the user and/or to take into account the fill-level when determining the volumetric flow. Furthermore, a grounding electrode serves to ensure sufficient grounding of the medium. Metallic process connections 2 are attached to the ends of the measuring tube. In this case, they are flanges which are designed to integrate the measuring tube into a pipeline.

Furthermore, two collars are attached to the measuring tube between the field return assembly and process connection 2, which form lateral outer walls of a housing. A first coil core group 17.1 has coil cores 7 which are arranged in a first cross-sectional plane A. A second coil core group 17.2 has coil cores 7 which are arranged in a second cross-sectional plane B. The positions of the coil cores 7 of the individual coil core groups 17 meet the requirements demanded, viz., that $60° \leq \beta \leq 80°$. The positions of the individual measuring electrodes 3 meet the requirements demanded, viz., that $20° \leq \alpha \leq 40°$.

Figure 2:
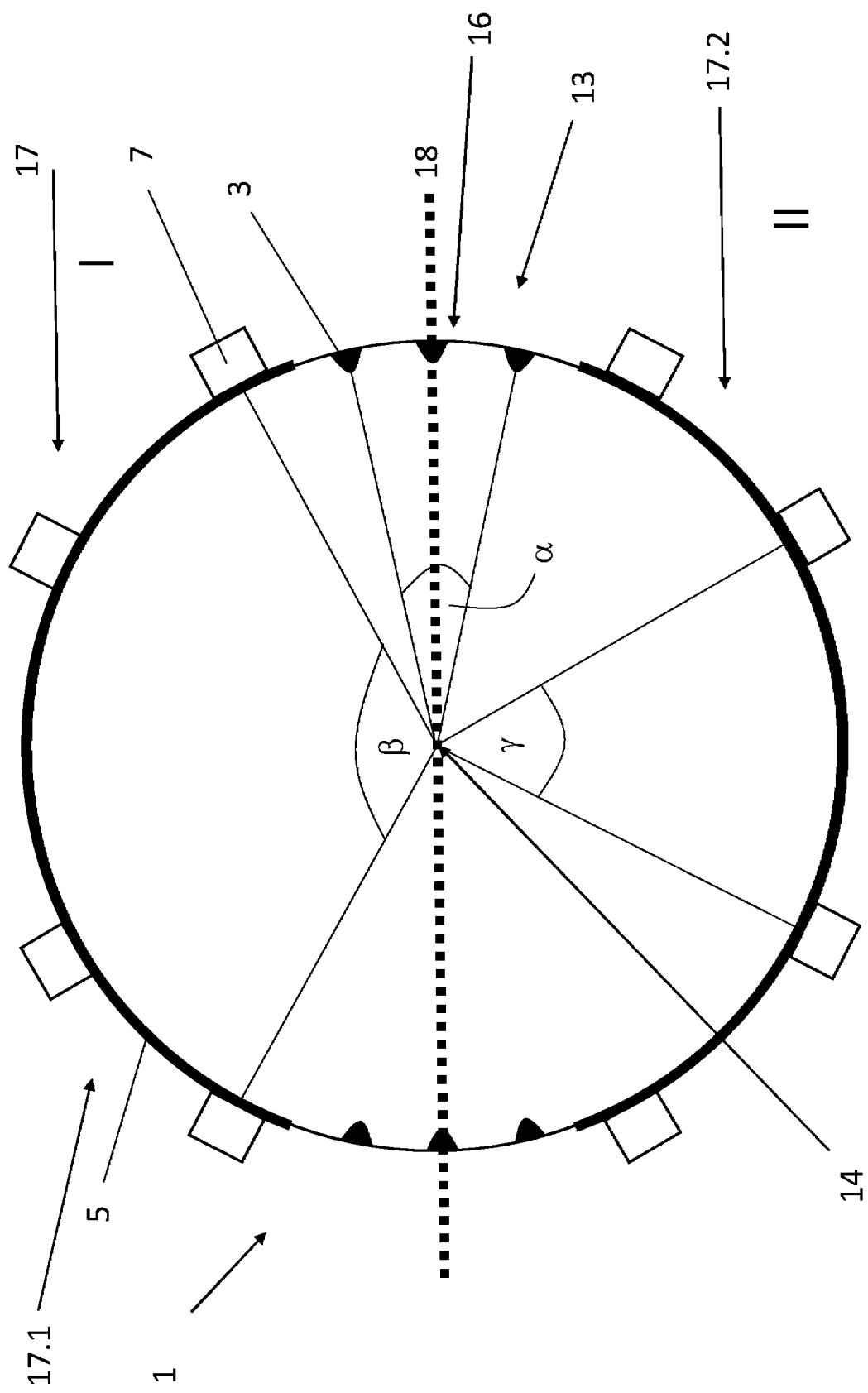

FIG. 2 shows a parallel projection representation of a second embodiment of the magnetic-inductive flow meter according to the invention for illustrating the arrangement of the coil cores 7 and of the measuring electrodes 3. The measuring tube 1 is divided into second parts I, II by means of a reference plane. A first coil core group 17.1 is arranged in the first part I, and a second coil core group 17.2 is arranged in the second part II. Compared to the first embodiment, each coil core group 17 comprises two further coil cores 7, which are arranged between the externally-situated coil cores 7 and whose position is described by the center angle γ. In cross-section, two opposing pole shoes 5 attached to the outer wall of the measuring tube 1 are shown. The shape of the two pole shoes 5 can be roughly described by a circular arc. According to this embodiment, four coil cores 7 are arranged on a pole shoe 5, and each have at least one coil (not shown) and connect the field returns to the pole shoes 5. The externally-situated coil cores 7, especially a point lying on the longitudinal axis of the respective coil core 7 and the center point 14 of the measuring tube 1, form, in cross-section, a circular arc having a center angle β. For the center angle β, it is the case that $30° \leq \beta \leq 120°$, especially $45° \leq \beta \leq 100°$, and preferably $60° \leq \beta \leq 80°$. The illustrated embodiment has a center angle β of about 110°. The externally-situated measuring electrodes 3 of the measuring electrode group 16 and the center point 14 form a circular section having a center angle α. For the center angle α, it is the case that $10° \leq \alpha \leq 60°$, especially $15° \leq \alpha \leq 50°$, and preferably $20° \leq \alpha \leq 40°$, is fulfilled. In the depicted embodiment, the center angle α is at about 30°. The arrangement of the internally-mounted coil cores can be characterized by a center angle γ. It is the case for this variable that $1° \leq \gamma \leq 80°$, especially $2° \leq \gamma \leq 50°$, and preferably $10° \leq \gamma \leq 40°$.

The invention claimed is:

1. A magnetic-inductive flow meter, the flow meter comprising:
   a measuring tube configured to convey a flowable medium in a longitudinal direction;
   a measuring electrode arrangement adpated to detect a measurement voltage induced in the medium and dependent upon a flow velocity of the medium, wherein the measuring electrode arrangement includes two measuring electrode groups of measuring electrodes, which are fastened opposite each other on the measuring tube; and
   a magnetic field generating device configured to generate a magnetic field that passes through the measuring tube, the magnetic field generating device including at least two coil core groups, each having at least two coil cores,
   wherein a reference plane, which is spanned by a longitudinal axis of the measuring tube and a transverse axis of the measuring tube, which intersects measuring electrodes of the measuring electrode arrangement, divides the measuring tube into a first part and a second part, wherein the first and second parts of the measuring tube each include at least one coil core group,
   wherein two radii, which intersect the coil cores of a coil core group that lie externally in a cross-sectional plane of the measuring tube, span a first center angle β,
   wherein the first center angle is $30° \leq \beta \leq 120°$,
   wherein, when the measuring electrode groups each comprise precisely one measuring electrode, the first center angle is $80° \leq \beta \leq 105°$, and
   wherein, when the measuring electrode groups each comprise at least two measuring electrodes, the first center angle is $60° \leq \beta \leq 80°$.

2. The flow meter of claim 1, wherein two radii, each of which intersects a measuring electrode, which lies externally in a cross-sectional plane of the measuring tube, of a measuring electrode group, span a second center angle α, wherein $10° \leq \alpha \leq 60°$.

3. The flow meter of claim 2, wherein the second center angle is 20°≤α≤40°.

4. The flow meter of claim 1, wherein each coil core group includes at least four coil cores, which are attached in a cross-sectional plane of the measuring tube,
wherein the radii that each intersect the internally-situated coil cores of a coil core group span a third center angle γ such that the third center angle is 1°≤γ≤80°.

5. The flow meter of claim 4, wherein the third center angle is 10°≤γ≤40°.

6. The flow meter of claim 1, wherein each coil core group includes at least three coil cores, wherein one of the three coil cores is intersected by the transverse axis extending perpendicular to the reference plane.

7. The flow meter of claim 1, wherein a coil core extends through at least two coils, wherein a longitudinal axis of the coil core extends parallel to the longitudinal axis of the measuring tube.

8. The flow meter of claim 1, wherein all coils connected in series have an electrical resistance between 2 and 300Ω.

9. The flow meter of claim 1, wherein all coils connected in series have an electrical resistance between 150 and 260Ω.

10. The flow meter of claim 1, wherein the magnetic field generating device includes two pole shoes, wherein the pole shoes are fastened opposite each other,
wherein the pole shoes each include at least two pole shoe bodies, and
wherein the pole shoe bodies comprise stacked sheets of sheet metal.

11. The flow meter of claim 10, wherein two adjacent pole shoe bodies are separated by a minimum distance in the longitudinal direction of the measuring tube, the minimum distance being less than 500 millimeters.

12. The flow meter of claim 10, further comprising a field return assembly attached as to abut an outer wall of the measuring tube, wherein the field return assembly comprises at least two field returns, wherein the coil cores connect the pole shoes to the field returns.

13. The flow meter of claim 1, wherein all measuring electrodes of one measuring electrode group of the two measuring electrode groups are electrically connected to each other.

14. The flow meter of claim 1, wherein the first and second parts of the measuring tube each have precisely two coil core groups, consisting of a first coil core group and a second coil core group arranged in the first part of the measuring tube,
wherein the first coil core group is disposed in a first cross-sectional plane, and the second coil core group is disposed in a second cross-sectional plane, and
wherein the first and second cross-sectional planes are spaced apart in the longitudinal direction of the measuring tube.

15. The flow meter of claim 1, wherein the measuring electrode arrangement is arranged in a third cross-sectional plane,
wherein the third cross-sectional plane is disposed between the first and second cross-sectional planes and defines a symmetry plane of the coil core groups and of the magnetic field generating device.

16. The flow meter of claim 13, wherein all measuring electrodes of one measuring electrode group of the two measuring electrode groups are electrically connected to each other by short-circuiting each other.

17. A magnetic-inductive flow meter, the flow meter comprising:
a measuring tube configured to convey a flowable medium in a longitudinal direction;
a measuring electrode arrangement adpated to detect a measurement voltage induced in the medium and dependent upon a flow velocity of the medium, wherein the measuring electrode arrangement includes two measuring electrode groups of measuring electrodes, which are fastened opposite each other on the measuring tube; and
a magnetic field generating device configured to generate a magnetic field that passes through the measuring tube, the magnetic field generating device including at least two coil core groups, each having at least two coil cores,
wherein a reference plane, which is spanned by a longitudinal axis of the measuring tube and a transverse axis of the measuring tube, which intersects measuring electrodes of the measuring electrode arrangement, divides the measuring tube into a first part and a second part, wherein the first and second parts of the measuring tube each include at least one coil core group,
wherein two radii, which intersect the coil cores of a coil core group that lie externally in a cross-sectional plane of the measuring tube, span a first center angle β,
wherein the first center angle is 30°≤β≤120°, and
wherein two radii, each of which intersects a measuring electrode, which lies externally in a cross-sectional plane of the measuring tube, of a measuring electrode group, span a second center angle α, wherein the second center angle is 20°≤α40°.

18. The magnetic-inductive meter of claim 17, wherein, when the measuring electrode groups each comprise precisely one measuring electrode, the first center angle is 80°≤β≤105°, and
wherein, when the measuring electrode groups each comprise at least two measuring electrodes, the first center angle is 60°≤β≤80°.

19. A magnetic-inductive flow meter, the flow meter comprising:
a measuring tube configured to convey a flowable medium in a longitudinal direction;
a measuring electrode arrangement adpated to detect a measurement voltage induced in the medium and dependent upon a flow velocity of the medium, wherein the measuring electrode arrangement includes two measuring electrode groups of measuring electrodes, which are fastened opposite each other on the measuring tube; and
a magnetic field generating device configured to generate a magnetic field that passes through the measuring tube, the magnetic field generating device including at least two coil core groups, each having at least two coil cores,
wherein a reference plane, which is spanned by a longitudinal axis of the measuring tube and a transverse axis of the measuring tube, which intersects measuring electrodes of the measuring electrode arrangement, divides the measuring tube into a first part and a second part, wherein the first and second parts of the measuring tube each include at least one coil core group,
wherein two radii, which intersect the coil cores of a coil core group that lie externally in a cross-sectional plane of the measuring tube, span a first center angle β,
wherein the first center angle is 30°≤β≤120°,
wherein the first and second parts of the measuring tube each have precisely two coil core groups, consisting of a first coil core group and a second coil core group arranged in the first part of the measuring tube, wherein the first coil core group is disposed in a first cross-sectional plane, and the second coil core group is disposed in a second cross-sectional plane, and wherein the first and second cross-sectional planes are spaced apart in the longitudinal direction of the measuring tube.

20. The magnetic-inductive flow meter of claim 17, wherein all measuring electrodes of one measuring electrode group of the two measuring electrode groups are electrically connected to each other by short-circuiting each other.

21. The magnetic-inductive flow meter of claim 19, wherein all measuring electrodes of one measuring electrode group of the two measuring electrode groups are electrically connected to each other by short-circuiting each other.

22. The magnetic-inductive flow meter of claim 19, wherein, when the measuring electrode groups each comprise precisely one measuring electrode, the first center angle is $80° \leq \beta \leq 105°$, and wherein, when the measuring electrode groups each comprise at least two measuring electrodes, the first center angle is $60° \leq \beta \leq 80°$.

23. The magnetic-inductive flow meter of claim 19, wherein two radii, each of which intersects a measuring electrode, which lies externally in a cross-sectional plane of the measuring tube, of a measuring electrode group, span a second center angle $\alpha$, wherein $10° \leq \alpha \leq 60°$.

24. The magnetic-inductive flow meter of claim 19, wherein each coil core group includes at least four coil cores, which are attached in a cross-sectional plane of the measuring tube, wherein the radii that each intersect the internally-situated coil cores of a coil core group span a third center angle $\gamma$ such that the third center angle is $1° \leq \gamma \leq 80°$.

25. The magnetic-inductive flow meter of claim 19, wherein the measuring electrode arrangement is arranged in a third cross-sectional plane, wherein the third cross-sectional plane is disposed between the first and second cross-sectional planes and defines a symmetry plane of the coil core groups and of the magnetic field generating device.

\* \* \* \* \*